March 15, 1932.                R. E. FIELDER                1,849,755
                      DRIVING MECHANISM FOR MOTOR VEHICLES
                    Filed July 2, 1929         4 Sheets-Sheet 2

INVENTOR
R. E. Fielder
BY
Morrison, Kennel Campbell
ATTORNEYS.

March 15, 1932.                R. E. FIELDER                 1,849,755
                      DRIVING MECHANISM FOR MOTOR VEHICLES
                         Filed July 2, 1929          4 Sheets-Sheet 3

Inventor
R. E. Fielder
By his Attorneys
Morrison, Kennedy&Campbell

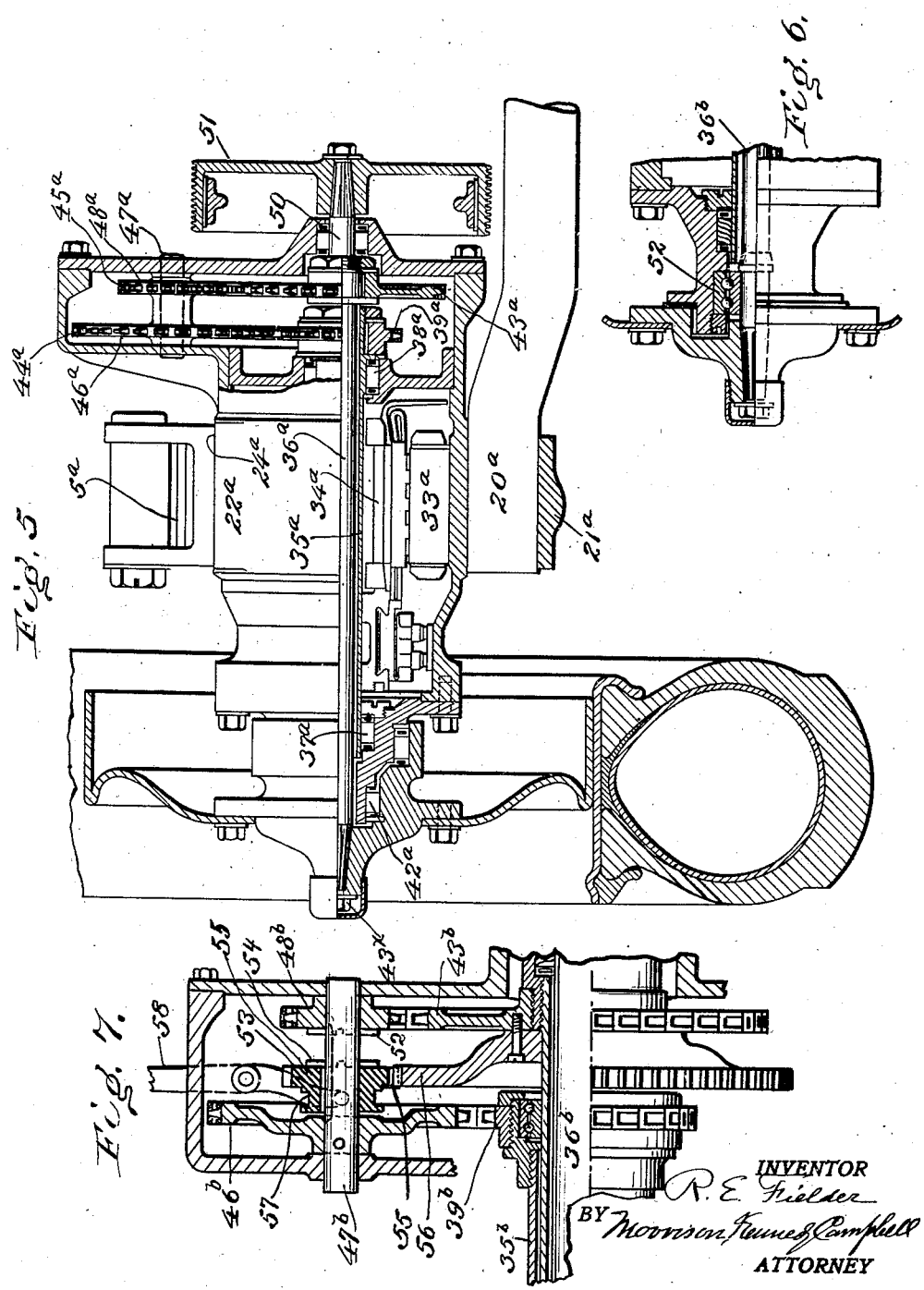

Patented Mar. 15, 1932

1,849,755

UNITED STATES PATENT OFFICE

REUBEN E. FIELDER, OF WEST ENGLEWOOD, NEW JERSEY

DRIVING MECHANISM FOR MOTOR VEHICLES

Application filed July 2, 1929. Serial No. 375,549.

This invention relates to the drive mechanism of motor vehicles, and is especially concerned with the employment of electricity as the motive power for such vehicles as motor cars, motor buses, motor trucks, and the like. The invention is directed to certain improvements in the type of electric drives for vehicles, in which an electric generator is driven by a gas or internal combustion or other engine, and the current from the generator supplied to electric motors associated with drive or ground wheels, and the invention will be described in detail in the specification to follow, and the novel features thereof will be pointed out in the appended claims.

In the acompanying drawings:—

Fig. 5 is a view similar to Fig. 4, showing a modification of the invention;

Fig. 6 is a fragmentary view, partly in section and partly in elevation, showing a modified form of the mounting of the ground wheel; and Fig. 7 is a sectional view of a form of the gearing between the driving and driven members, operable to reverse the direction of drive, without reversing the motor.

Figure 1:
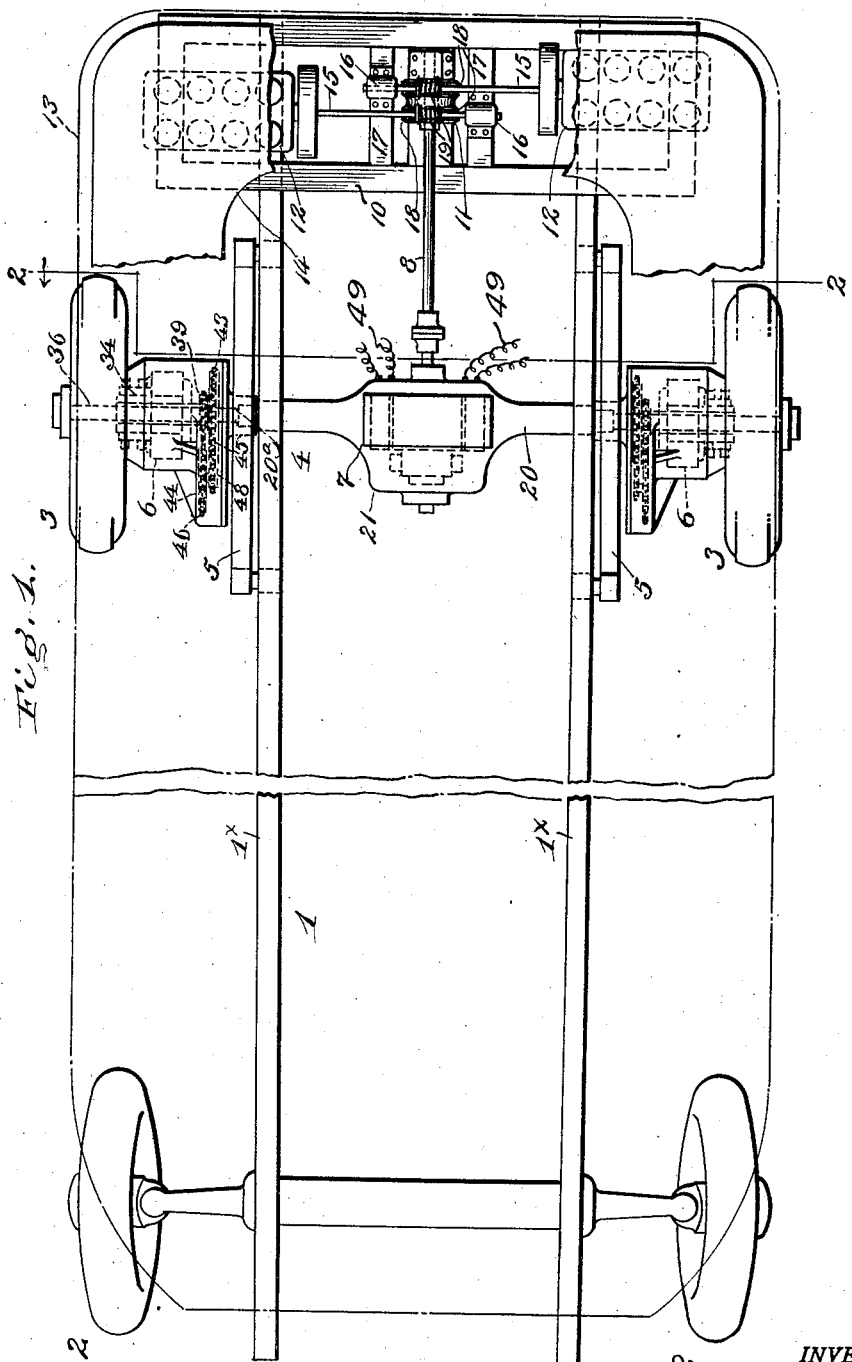
Figure 1 is a plan view of a chassis frame of a motor vehicle and the rear portion of the body, the same having my improved driving mechanism applied thereto.
Figure 4:
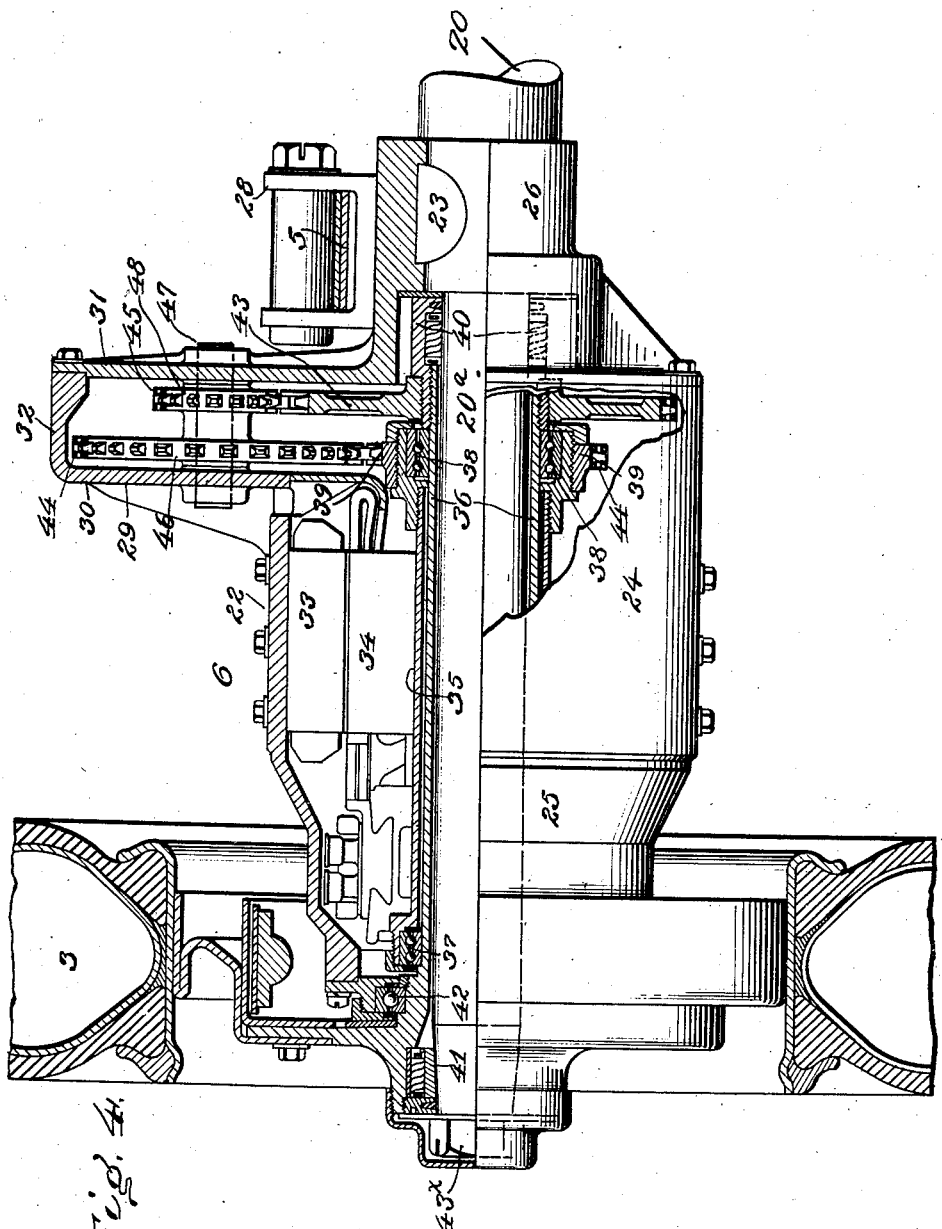
Fig. 4 is a view on enlarged scale, partly in longitudinal section and partly in elevation, of one end of the transverse load supporting member, the electric motor incorporated therein, and the ground wheel driven by said motor.

Referring to the drawings:

Referring particularly to Figs. 1 to 4, a chassis frame 1 provided with fore-and-aft extending frame bars 1ˣ, is supported at its front by the usual steering wheels 2, and at its rear by driving ground wheels 3, which latter are journalled on the ends of a fixed transverse load supporting member 4 in the manner shown in Figure 4, which gives support to the chassis frame through the medium of the usual springs 5, shackled or otherwise connected to the chassis frame, and seated on and fastened to the load supporting member.

The drive wheels are driven by electric motors 6 incorporated in the ends of the load supporting member 4, as will be presently described in detail, which motors are supplied with electric current from an electric generator 7 mounted in the central portion of the load supporting member. The generator is driven by a propeller or driving shaft 8, the forward end of which is coupled to the generator, whence the shaft extends rearwardly longitudinally of the frame, and is journalled at its rear end in a transverse frame member 10 fixed to and carried by the rear end of the chassis frame. This shaft near its rear end has fixed to it a driving member 11, which is driven by two gasoline engines 12, arranged one on either side of the shaft.

The gasoline engines are supported on the transverse frame member 10, and are arranged under the floor of the vehicle body 13, beneath a rear transverse seat 14 supported within the body at the rear end thereof, so that the full extent of the floor space is available for passenger seats, and is not obstructed by the engine.

The engines 12 are similar as to their direction of rotational drive, and their engine shafts 15 are extended inwardly towards each other and over the driving member 11, and overlap at their inner ends, where they are journalled in suitable bearings 16 supported on cross bars 17 of the frame member 10.

The driving member 11 is in the present instance in the form of a wheel formed with two sets of worm teeth 18, which are engaged respectively by right and left worms 19 on the engine shafts 15, whereby, notwithstanding the opposite disposition of the two similar engines, their driving effort on the worm wheel member will be exerted in the same direction.

Figure 2:
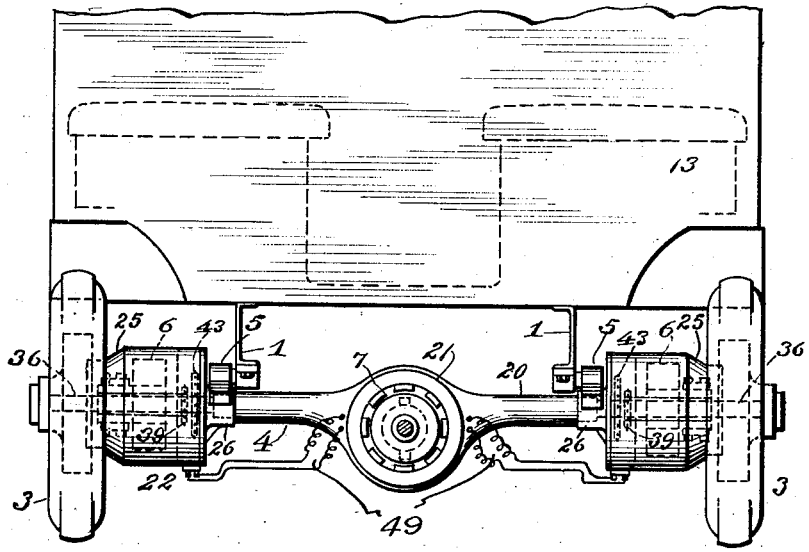
Fig. 2 is a cross section of the same on the line 2—2 of Fig. 1, looking from the rear.
Figure 3:
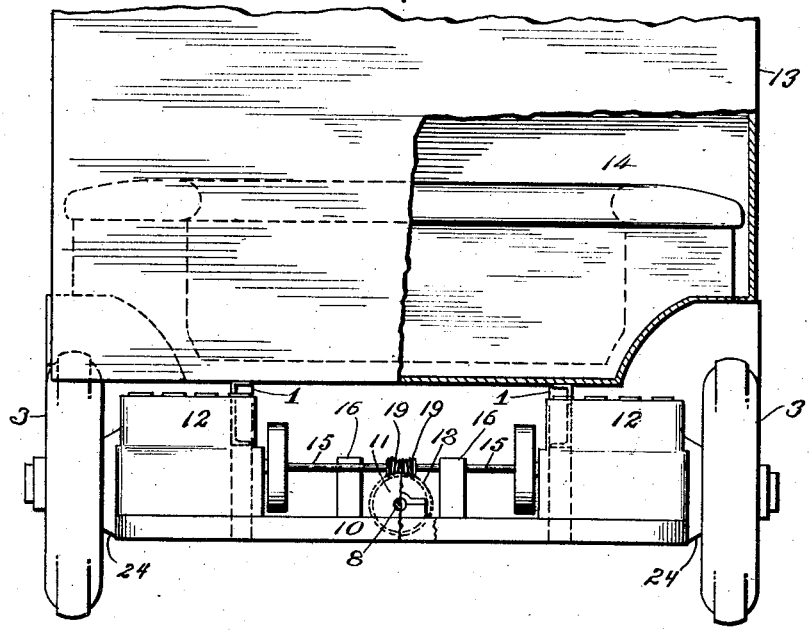
Fig. 3 is a rear elevation of the parts shown in Fig. 1.

As best shown in Figs. 2 and 4, the load supporting member 4 comprises a solid axle portion 20 formed with an enlarged open center 21 to receive and support the generator 7, and whose ends formed as spindles 20ᵃ, and housings 22, which surround and are keyed fixedly to the axle portion as at 23, so as thereby to form in effect parts of the same, the load supporting member being thus made up jointly of the axle portion with its end spindles and the end housings fixed thereto.

These housings enclose the electric motors 6, and as the housings and motors and associated parts are identical in construction at both ends of the load supporting member, a detailed description of the parts at one end will suffice.

The housing 22 is cylindrical in cross section, and is formed with an enlarged central portion 24 and reduced outer and inner end portions 25 and 26, the latter being flattened on its upper side to form a seat for the spring clip 28. At its inner end, the enlarged portion of the housing is extended radially at one side as at 29, thereby forming a lateral extension of the chamber within the housing, which extension is provided with front and rear flat walls 30 and 31, and an end wall 32, the purpose of which will presently appear.

The motor 6 within the housing 22, comprises a motor field 33 fixed to the housing within the enlarged central portion of the same, as best shown in Fig. 4, and a rotary armature 34 disposed within the field and fixed to a driving member in the form of a sleeve 35 surrounding the axle spindle. This driving sleeve is rotatably supported at its inner and outer ends by a driven member in the form of a sleeve 36 surrounding the spindle between the latter and the driving sleeve, the support of the driving sleeve being effected through the medium of an outer anti-friction bearing 37 and an inner anti-friction bearing 38; and at its inner end the sleeve 35 has fixed to it a sprocket wheel 39, the purpose of which will presently appear.

The driven sleeve 36 is rotatably supported on the axle spindle by an inner anti-friction bearing 40 and an outer anti-friction bearing 41, and is further supported at its outer end within the outer end of the housing 22 by means of an anti-friction bearing 42. Near its inner end and at a point inward of the sprocket wheel 39, the sleeve 36 has fixed to it a sprocket wheel 43, by which the rotary motion of the driving sleeve is imparted to the driven sleeve 36 and to the drive wheel 3, whose hub is fixed to the outer end of the sleeve 36, and together with the sleeve, is confined on the spindle by a hub nut 43ˣ.

The motion of the driving sleeve 35 is transmitted to the driven sleeve 36, and consequently to the drive wheel, at relatively reduced speed through the medium of sprocket chains 44 and 45, the chain 44 passing around the sprocket wheel 39 and a sprocket wheel 46 of relatively larger diameter on a countershaft 47 journalled in bearings in the walls 30 and 31, whereby the motion of the driving sleeve is transmitted to the countershaft at reduced speed, and the sprocket chain 45 passing over the sprocket wheel 43 and over a sprocket wheel 48 on said countershaft, and of a diameter less than that of the wheels 43 and 46, whereby the motion of the countershaft is in turn transmitted to the driven sleeve, and consequently the drive wheel, at speed further reduced.

It will be understood that the electric current from the generator will be supplied to the motors at the opposite ends of the load supporting member by suitable conductors 49, and further, it will be understood that the driving power for the two drive wheels is the same on both sides and entirely independent of each other, so that no differential gearing between the two drive wheels will be required. The driving wheels being thus independently driven by electric motors, the electrical energy will flow in the required proportion to the wheel that requires the greater or lesser speed, or has the greater or lesser load imposed on it, as the case may be.

On the supply of electrical energy to the motors, the armatures 34 will be rotated at high speed, say about 4,000 R. P. M., but this speed is reduced by the form of the reduction gearing described, so that the ground wheels will be rotated at the proper speed for the desired conditions of operation, say about 250 R. P. M., which with a wheel of 40″ in diameter, will give a travel of approximately 30 miles per hour.

In the operation of the improved electric driving mechanism above described, the speed of the vehicle will be controlled entirely by the output of the electric generator, which in turn will be controlled by the throttle of the engine, so that no change speed gearing or gear shifting mechanism will be necessary in the system.

In Fig. 5 a modified form of the transverse load supporting member and of the wheel driving mechanism is shown. In this case the motor enclosing housing 22ᵃ is attached at its underside to the end of the axle portion 20ᵃ of the load carrying member as at 21ᵃ, and the supporting spring 5ᵃ is clipped to the enlarged central portion 24ᵃ of the housing. The motor field 33ᵃ is, as before, fastened fixedly to the interior of the housing, and the armature 34ᵃ, is, as before, carried by the driving sleeve 35ᵃ rotatably mounted in the housing by means of anti-friction bearings 37ᵃ and 38ᵃ. This sleeve carries a sprocket wheel 39ᵃ driving a sprocket wheel 46ᵃ on the countershaft 47ᵃ by a chain 44ᵃ, the motion of which countershaft is transmitted to the driven member 36ᵃ by means of a sprocket wheel 48ᵃ on the countershaft, sprocket chain 45ᵃ and sprocket wheel 43ᵃ on the driven member. The driven member in this embodiment of the invention is in the form of a shaft journalled near its inner end in the housing by means of an anti-friction bearing 40ᵃ, which shaft extends within the driving sleeve and outwardly beyond the outer end of the same where it is formed with a toothed tapered terminal portion, over which the hub of the drive wheel is fitted and confined thereon by the hub nut 43ˣ, the said hub being rotatably mounted in the outer end of the housing by means of the anti-friction bearing 42ª. At its inner end the shaft is extended beyond the bearing 40ª, in the form of a spindle 50, over which is fitted and confined thereon, a brake drum 51.

The operation of this form of the invention is similar to that as described, in that the rotary motion of the motor armature is transmitted through the sprocket wheel and chain gearing to the drive wheel at reduced speed.

In Fig. 6 a modified form of the drive wheel mounting in relation to the rotary shaft 36ᵇ and housing, is shown. In this case, the hub of the drive wheel is, as in the form of the invention shown in Fig. 5, fitted over the end of the shaft, and the latter is rotatably supported adjacent the hub within the outer end of the housing, by means of an anti-friction bearing 52, whereby the shaft carries the entire load of the drive wheel, which load in the form of the invention shown in Fig. 5, was carried jointly by the shaft and the housing.

With the form of gearing between the driving member and driven member, as hereinbefore described, no provision is made for reversing the direction of drive of the drive wheels, without reversing the direction of rotation of the electric motors. As special wiring and other complications would be involved in the adaptation of the motors for reversed drive, I propose in order to avoid such complications, to so modify and form the gearing between the driving and driven members, that a reverse drive may be imparted to the drive wheels without changing the direction of rotation of the motors. A form of the gearing whereby this object is effected is represented in Fig. 7, where it will be seen that the sprocket wheel 46ᵇ is fixed to the countershaft 47ᵇ, as before, while the sprocket wheel 48ᵇ is rotatable freely on said shaft, and is provided on its side with clutch teeth 52. A clutch member 53 is splined to the shaft between the two wheels, and is provided on its side with clutch teeth 54, adapted when the clutch member is shifted to the right in Fig. 7, to engage the clutch teeth on the side of the wheel 48ᵇ, and thereby cause the rotary action of the wheel 46ᵇ to be transmitted to the wheel 48ᵇ to rotate the drive wheel in a forward direction. The clutch member 53 carries a spur pinion 55, adapted when the clutch member is moved along the shaft to the left in Fig. 7 to disengage the clutch teeth, to engage with a spur pinion 56 fixed to the side of sprocket wheel 43ᵇ, whereby the motion of the wheel 46ᵇ will be transmitted to the driving member in reverse direction, and the drive wheel will be similarly reversely rotated.

The clutch member is provided with a peripheral groove 57, in which is engaged a fork 58 for shifting the member along the shaft, either to engage the clutch teeth to drive the drive wheel in a forward direction, or to disengage the clutch teeth and engage the spur pinions to drive the drive wheel in a reverse direction as described, it being understood that such reversal of drive is effected in a purely mechanical manner by the shifting of the clutch member, while maintaining the normal rotational direction of drive of the electric motor.

In the foregoing description and accompanying drawings, I have set forth my invention in the particular detailed forms which are suitable for realizing the advantages and objects of the invention. It will be understood however, that these details may be variously changed and modified by the skilled mechanic without departing from the spirit of the invention; and further, it will be understood that the invention is not limited to any particular form or construction of the parts, except in so far as such limitation is specified in the claims.

Having thus described my invention, what I claim is:—

1. In combination with a fixed load supporting member provided with a housing and adapted to support a chassis frame said housing being formed at one side with a lateral local extension having opposing walls, an electric motor field fixed in said housing, a driving sleeve rotatable within the housing and surrounded by said motor field, a motor armature on said sleeve, a driving sprocket wheel on the sleeve, a countershaft journalled between the walls of said local extension of the housing, a sprocket wheel on said countershaft, a sprocket chain connecting said sprocket wheels, a second sprocket wheel on the countershaft, a driven member disposed concentrically and rotatable within the driving sleeve, a sprocket wheel thereon, a sprocket chain connecting the last mentioned sprocket wheel with the second sprocket wheel on the countershaft, and a drive wheel connected to and driven by said driven member.

2. In combination with a fixed load supporting member provided with a housing and with a spindle extending within the housing and adapted to support a chassis frame, an electric motor field fixed in said housing, a driven sleeve surrounding the spindle and rotatably supported thereby within the housing, and surrounded by said fixed motor field, a drive wheel attached to and driven by said sleeve surrounding the driven sleeve and a driving sleeve supported by and rotatable thereon, a motor armature fixed to the driving sleeve, and a reduction gearing between the driving sleeve and driven sleeve.

3. In combination with a fixed load supporting member provided at one end with a spindle and with a housing surrounding the spindle and surrounded by said fixed motor field and adapted to support a chassis frame, an electric motor field fixed within the housing, a driven sleeve surrounding and rotatably supported on the spindle, a drive wheel fixed to and rotatable by said driven sleeve, a driving sleeve surrounding and rotatably supported on the driven sleeve, a motor armature on the driving sleeve, and reduction gearing between the driving sleeve and driven sleeve to drive the latter at relatively reduced speed.

In testimony whereof, this specification has been duly signed by:

REUBEN E. FIELDER.